United States Patent
Bagley et al.

(10) Patent No.: US 6,963,928 B1
(45) Date of Patent: Nov. 8, 2005

(54) SYSTEMS AND METHODS FOR COMMUNICATING ACROSS VARIOUS COMMUNICATION APPLICATIONS USING SINGLE ADDRESS STRINGS

(76) Inventors: David T. Bagley, 24542 Via Tonada, Lake Forest, CA (US) 92630; Roger N. Fearing, 23240 Burbank Blvd., Woodland Hills, CA (US) 91367

( * ) Notice: Subject to any disclaimer, the term of this patent is extended or adjusted under 35 U.S.C. 154(b) by 0 days.

(21) Appl. No.: 09/579,947

(22) Filed: May 26, 2000

Related U.S. Application Data

(60) Provisional application No. 60/137,137, filed on May 27, 1999, provisional application No. 60/138,927, filed on Jun. 11, 1999, provisional application No. 60/153,426, filed on Sep. 10, 1999.

(51) Int. Cl.[7] .............................................. G06F 15/16
(52) U.S. Cl. ...................................... 709/245; 709/206
(58) Field of Search ............................... 709/245, 206; 379/90.01, 93.01, 93.09, 93.24

(56) References Cited

U.S. PATENT DOCUMENTS

| | | | | |
|---|---|---|---|---|
| 5,812,776 A | * | 9/1998 | Gifford | 709/217 |
| 5,995,725 A | * | 11/1999 | Dillon | 709/203 |
| 5,999,965 A | * | 12/1999 | Kelly | 709/202 |
| 6,014,711 A | * | 1/2000 | Brown | 709/245 |
| 6,085,231 A | * | 7/2000 | Agraharam et al. | 709/206 |
| 6,104,711 A | * | 8/2000 | Voit | 370/352 |
| 6,131,095 A | * | 10/2000 | Low et al. | 707/10 |
| 6,205,139 B1 | * | 3/2001 | Voit | 370/389 |
| 6,211,972 B1 | * | 4/2001 | Okutomi et al. | 358/402 |
| 6,215,790 B1 | * | 4/2001 | Voit et al. | 370/401 |
| 6,233,234 B1 | * | 5/2001 | Curry et al. | 370/356 |
| 6,240,445 B1 | * | 5/2001 | Kumar et al. | 709/206 |
| 6,243,443 B1 | * | 6/2001 | Low et al. | 379/88.17 |
| 6,246,758 B1 | * | 6/2001 | Low et al. | 379/230 |
| 6,282,281 B1 | * | 8/2001 | Low | 379/230 |
| 6,282,574 B1 | * | 8/2001 | Voit | 709/230 |
| 6,347,085 B2 | * | 2/2002 | Kelly | 370/352 |
| 6,377,568 B1 | * | 4/2002 | Kelly | 370/352 |
| 6,438,217 B1 | * | 8/2002 | Huna | 379/88.14 |
| 6,466,570 B1 | * | 10/2002 | Low et al. | 370/352 |
| 6,477,243 B1 | * | 11/2002 | Choksi et al. | 379/100.06 |
| 6,516,203 B1 | * | 2/2003 | Enzmann et al. | 455/556.1 |
| 6,516,311 B1 | * | 2/2003 | Yacoby et al. | 707/3 |
| 6,539,015 B2 | * | 3/2003 | Voit | 370/389 |
| 6,594,254 B1 | * | 7/2003 | Kelly | 370/352 |
| 6,609,005 B1 | * | 8/2003 | Chern | 455/457 |

(Continued)

FOREIGN PATENT DOCUMENTS

GB    2274758    8/1994

(Continued)

OTHER PUBLICATIONS

M2 Presswire, "Winbox.com: Winbox.com—turning every mobile phone number into an e-mail address; An innovative and efficient solution to combining mobile telephony, e-mail and fax," Mar. 21, 2000, M2 Presswire, pp. 1ff.*

(Continued)

*Primary Examiner*—Bradley Edelman
(74) *Attorney, Agent, or Firm*—Merek, Blackmon & Voorhees, LLC

(57) ABSTRACT

Systems and methods are disclosed for providing addressing strings formats and associated system implementations to minimize the number of different addressing strings used for communicating across different communication applications. The systems and methods receive a valid address string that can be inputted into a communication applications selected from a collection of communication applications wherein the same address string can be input for any selected communication application from that collection.

110 Claims, 6 Drawing Sheets

U.S. PATENT DOCUMENTS

| | | | |
|---|---|---|---|
| 2002/0016174 A1* | 2/2002 | Gibson et al. | 455/464 |
| 2003/0118034 A1* | 6/2003 | Furukawa et al. | 370/400 |
| 2003/0169727 A1* | 9/2003 | Curry et al. | 370/352 |

FOREIGN PATENT DOCUMENTS

| | | |
|---|---|---|
| GB | 2315387 | 1/1998 |
| WO | WO 97/31490 | 8/1997 |
| WO | WO 98/53582 | 11/1998 |
| WO | WO 99/57876 | 11/1999 |

OTHER PUBLICATIONS

Marshall, "Internet Explorer 5.0 sports search, interface tweaks," Nov. 9, 1998, InfoWorld, vol. 20, Iss. 45, p. 70.*

Vegvari, "Web browsers duke it out," Apr. 8, 1996, Computerworld, vol. 30, Iss. 15, pp. 68ff.*

Printout from Internet Archive WayBack Machine, http://web.archive.org/web/*/www.1-800-flowers.com, including printout of th link http://web.archive.org.web/19961227023140/http://www.1-800-flowers.com/, 1996.*

1-800-FLOWERS, Web Archive copy of 1-800-FLOWERS website as of Dec. 1996, from http://web.archive.org/web/19961223001308/http://www.1800flowers.com/, pp. 1-4 as printed.*

Dial A Mattress Home Page, Web Archive copy of Dial-a-Mattress website as of Feb. 1998, from http://web.archive.org/web/19980210090510/http://mattress.com/, pp. 1-3 as printed.*

1-800-COLLECT, Web Archive copy of 1-800-COLLECT website as of Jan. 1999, from http://web.archive.org/web/19990125073318/http://1800collect.com/, pp. 1-2 as printed.*

ESPN.com, Web Archive copy of ESPN.com website as of Jan. 1999, from http://web.archive.org/web/199901285631/http://espn.go.com/, pp. 1-2 as printed.*

Campbell, "Floral Website Ends Online Stress," Apr. 1999, Bank Marketing, vol. 31, Iss. 4, p. 8.*

Vaha-Sipila, "URLs for Telephone Calls," Oct. 8, 1999, Internet Draft, pp. 1-20, printed from http://ftp.ist.utl.pt/pub/drafts/draft-antti-telephony-url-11.txt.*

* cited by examiner

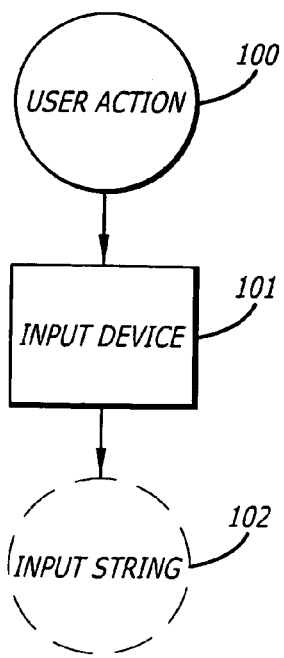
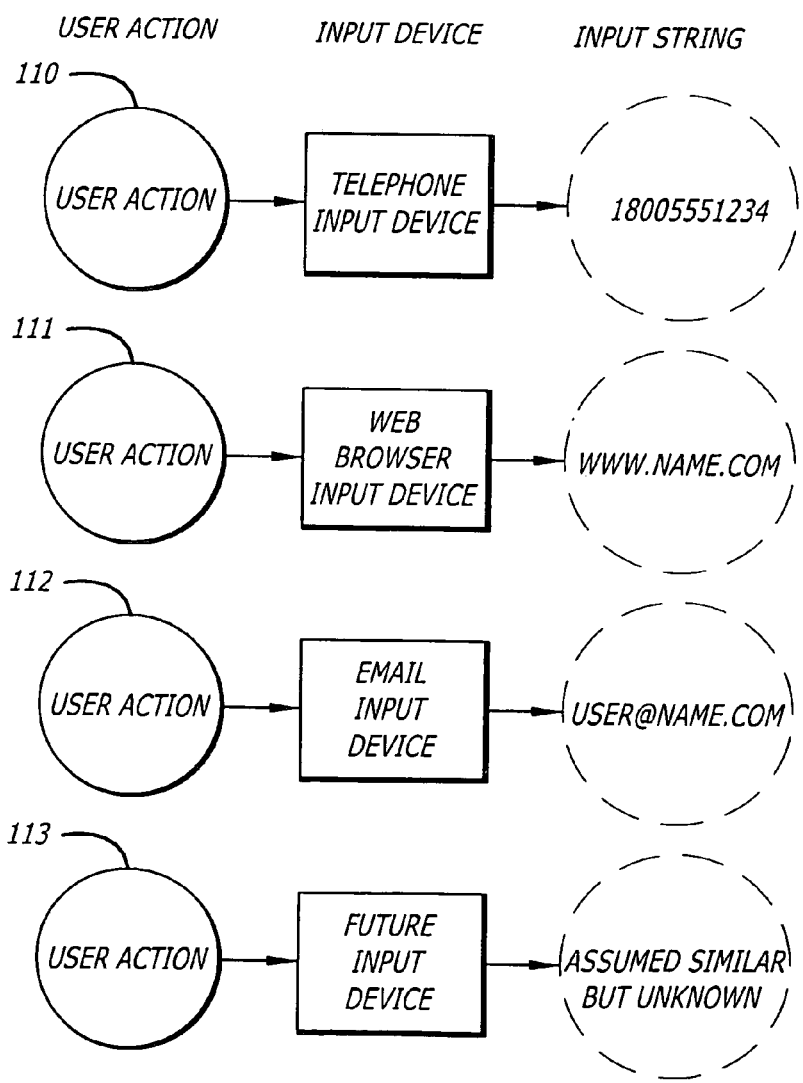
FIG. 1.0
FIG. 1.1

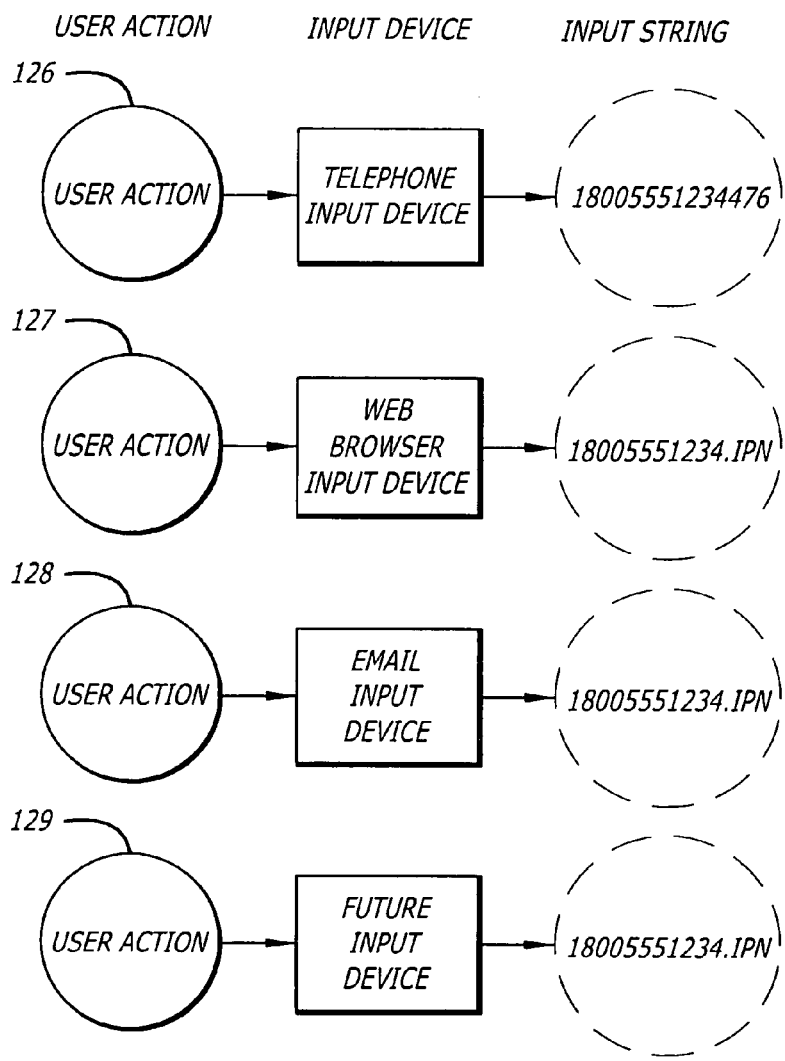

FIG. 2.0
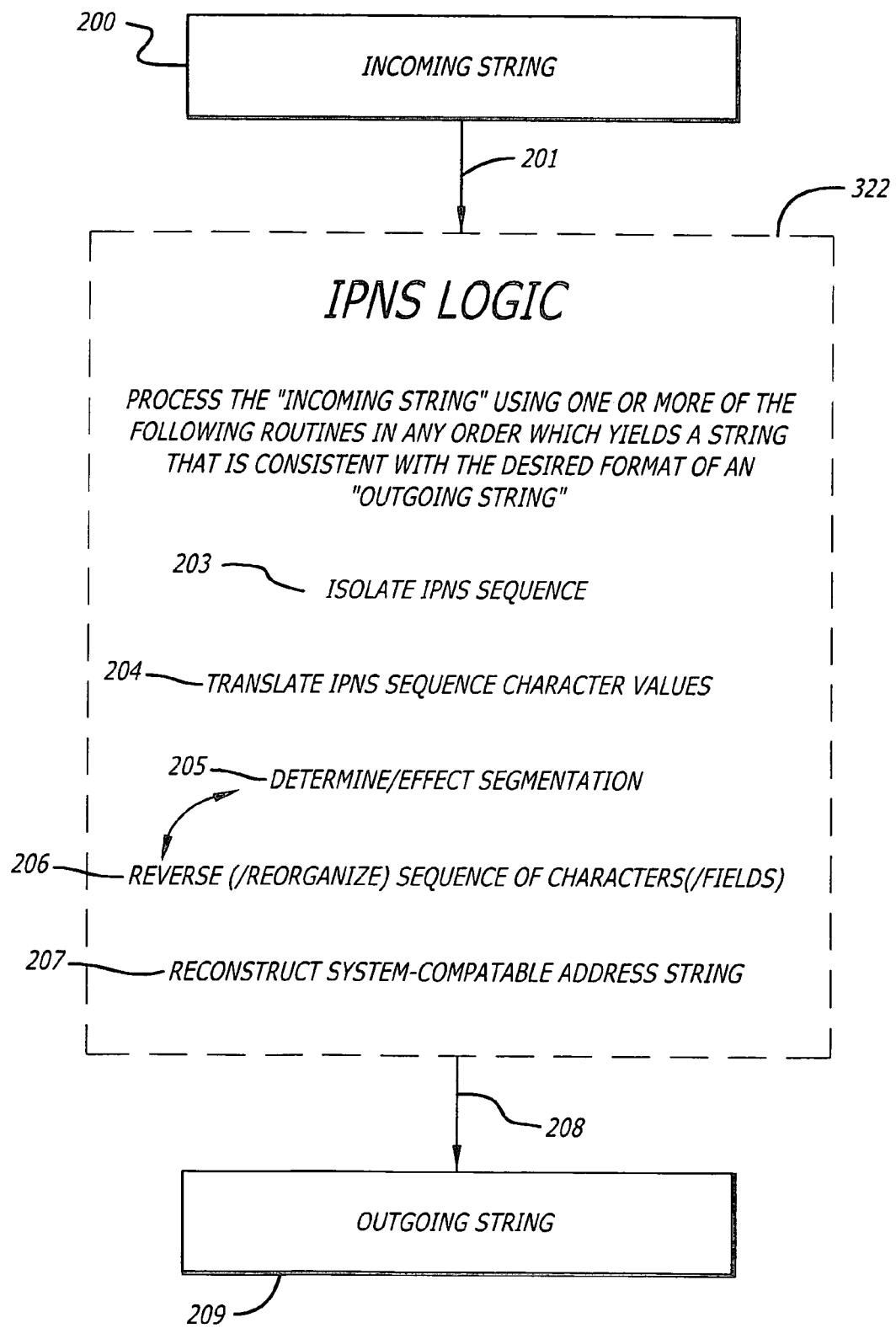

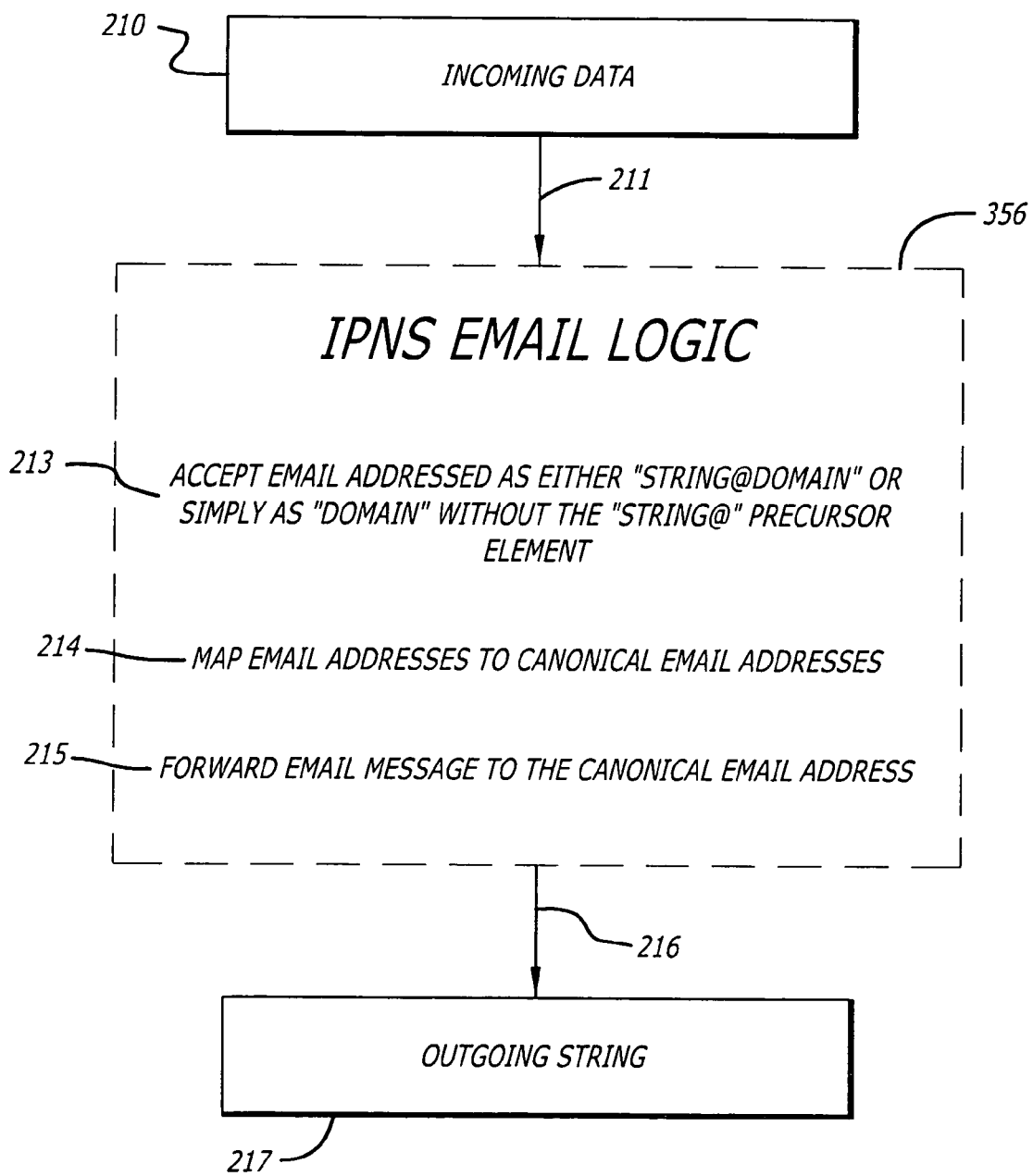
FIG. 2.1

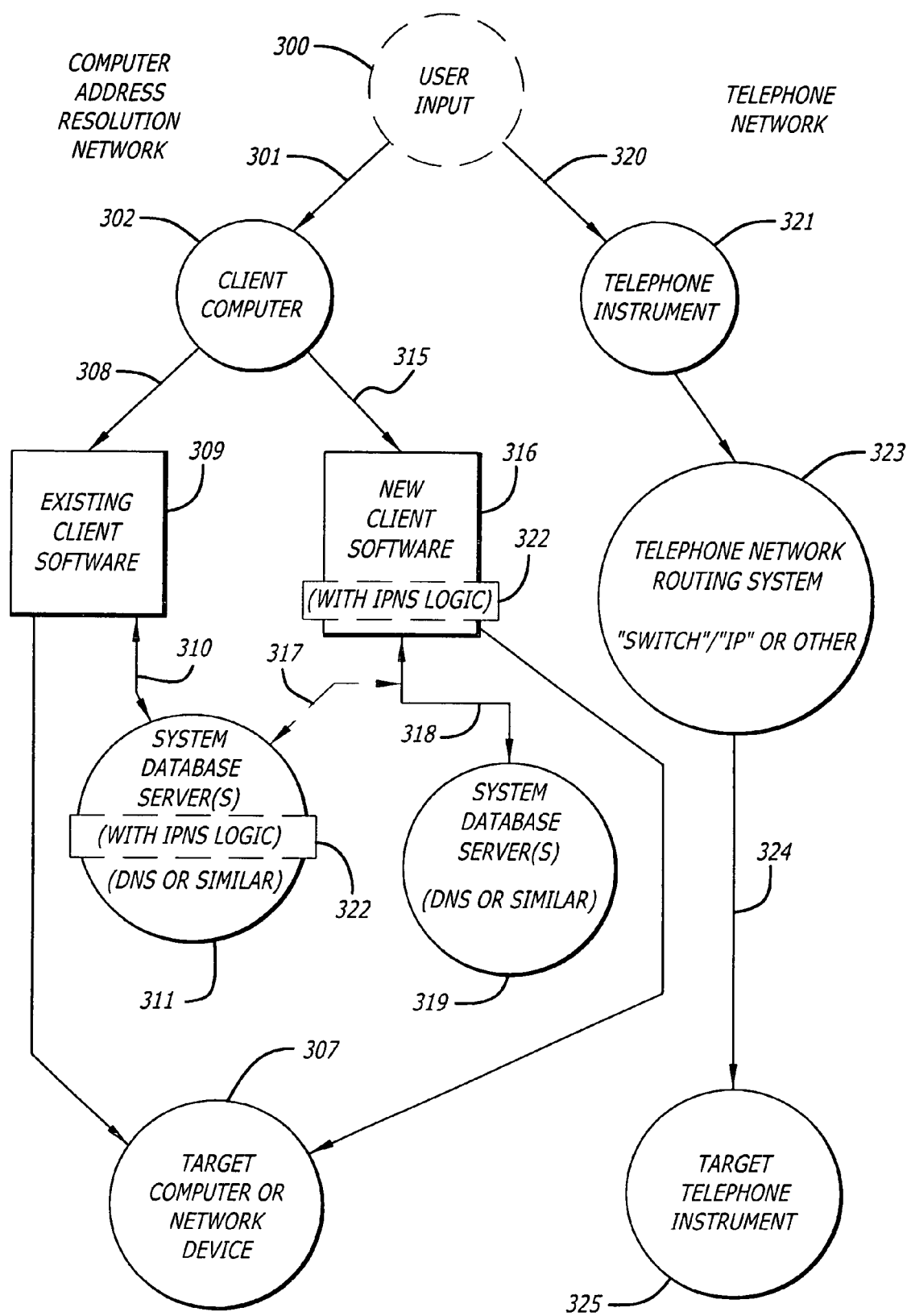
FIG. 3.0

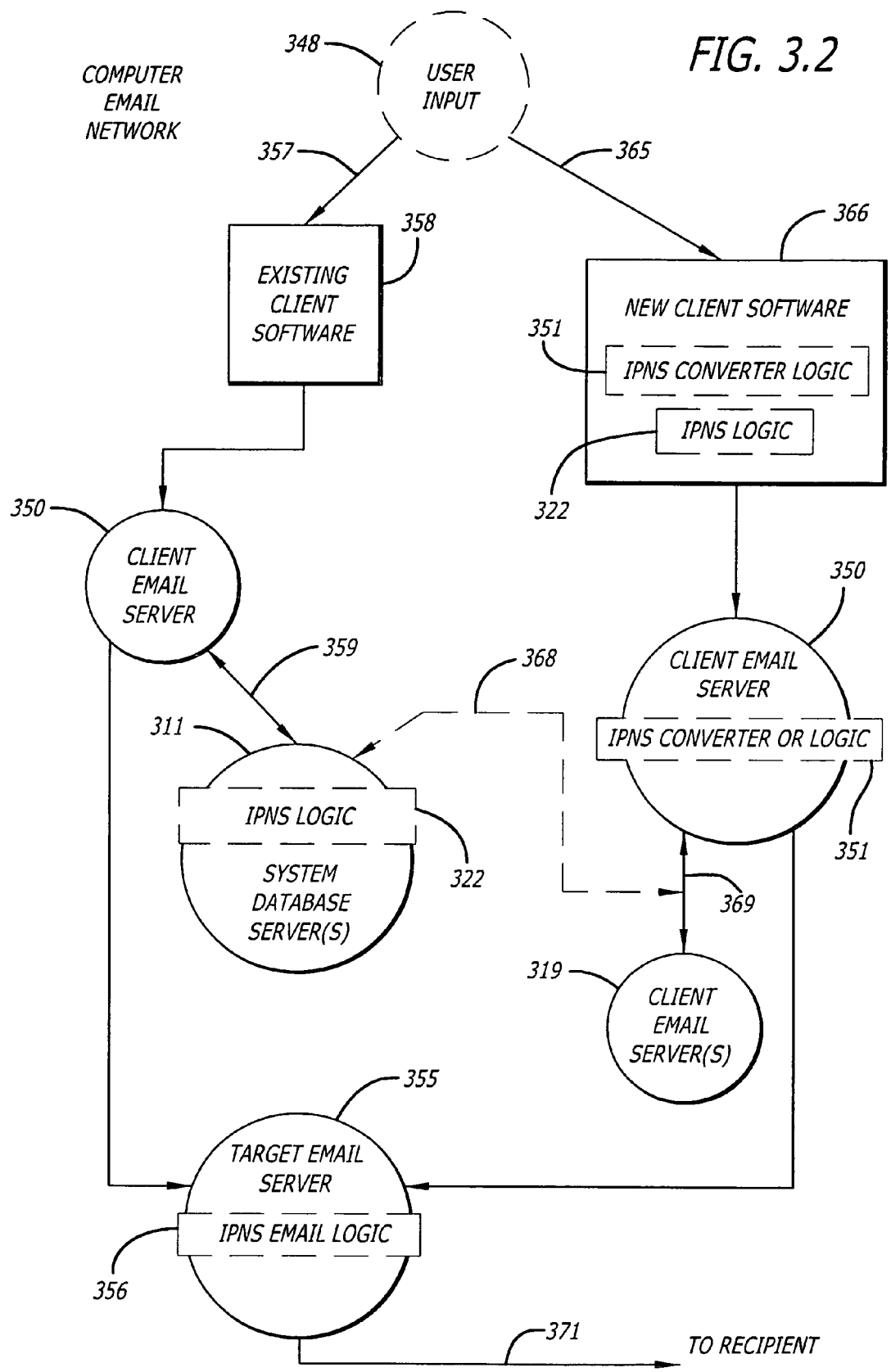
FIG. 3.2

US 6,963,928 B1

SYSTEMS AND METHODS FOR COMMUNICATING ACROSS VARIOUS COMMUNICATION APPLICATIONS USING SINGLE ADDRESS STRINGS

RELATED APPLICATIONS

This application claims priority from U.S. provisional applications: 1) Ser. No. 60/137,137, entitled "Error Correcting Addressing System for Internet, Telephone and Other Communication Systems Using a Single Universal Address String", filed on May 27, 1999; 2) Ser. No. 60/138,927, entitled "Error Correcting Addressing System for Internet, Telephone and Other Communication Systems Using a Single Universal Address String", filed on Jun. 11, 1999; and 3) Ser. No. 60/153,426, entitled "Error Correcting Addressing System for Internet, Telephone and Other Communication Systems Using a Single Universal Address String", filed on Sep. 10, 1999. The text of each of these applications are incorporated herein by reference.

FIELD OF THE INVENTION

The present invention is generally directed to addressing strings used by different communication applications to communicate.

BACKGROUND OF THE INVENTION

Presently, users of most communication applications such as telephone, electronic mail (email) or Internet websites are required to input a predetermined address string into a communication application in order to establish the desired communication with the intended recipients. For example, the user of an email application must input an address string in the form of a predetermined email address such as johndoe@address.com in order to send an email message to the recipient.

An address string is generally presumed to be a sequence of components having alpha-numeric or other human and/or machine recognizable characters. Such address sequences can generally be of any length or component type but their exact configurations are typically predetermined by the service provider of the communication application. For example in the case of telephone, the address string used is the telephone number whose length and digit sequence are often set by the telephone service provider. Likewise, in the case of an Internet website, a predetermined Uniform Resource Locator (URL) is typically used by an Internet user to access a desired website.

The use of some address strings, such as telephone numbers, to establish communication with another location across a communication medium has been well known in the art. But recent technological advances, especially in the computer networking and telecommunication fields have resulted in the introduction of numerous new and/or different forms of communication. For example, communication by use of electronic mail, World Wide Web sites, or other communication application such as facsimile are amongst such previously unavailable alternatives to a telephone call.

The increase in the number of ways to communicate, however, has resulted in an undesirable corresponding increase in both the number and types of address strings associated with each such form of communication. Furthermore, the underlying technologies used to implement such diverse communication applications typically require a user to input an address string that is largely unique to that technology in order to operate and derive the desired benefit from the communication application. Even the communication applications of the same type but with different formats, such as an email application by two different email service providers, often require the use of different address strings. For example an individual having email accounts with two or more email service providers is a single recipient entity who will nonetheless have two or more associated email addresses, usually in the form of one email address for each service provider.

One problem with the existing approach of assigning one address string per user per communication application is the generation of multiple address strings for a single recipient. For example, in trying to establish communication with a hypothetical recipient John Doe having email, world wide web site and a telephone, an end-user must often know and correctly remember the distinct address strings associated with each such application in order to establish communication with John Doe using that application. The user would thus have to correctly input for example, johndoe@address.com to send Doe an email, input an often lengthy and difficult to remember URL string such as http://www.address.com/johndoe to access Doe's website and input a phone number into a phone system in order to establish telephone communication with Doe.

The requirements for an end-user to know and correctly remember the separate address strings is further exacerbated by the prior art's use of Domain Names as website addresses. A Domain Name, such as www.uspto.gov, is a form of an address string that is generally designed to include human recognizable characters and/or numbers in order to aid the user with the finding and/or recollection of the correct address string. Once inputted into the communication application, a system Domain Name Server (DNS) converts the Domain Name into a standard numeric Internet Protocol (IP) Address such as 255.100.1.0 for internal network use.

The implementation of Domain Names as address strings has not however been without shortcomings. Domain Names have grown increasingly longer in length over time, making them harder to remember. In addition, there is a general lack of a standards as to what spelling conventions will be adhered to in the domain name composition, or even what language they are to appear in. Since domain names are often registered for legal recognition, such lack of standards often translate into having to register a domain name in numerous ways to encompass the different languages and/or spelling variations within each language in which domain name is to be used.

Furthermore, since for practical purposes there are a relatively limited number of words with which to create a domain name, legal ramifications such as trademark disputes and the illicit cumulating of domain names in violation of cybersquatting laws have followed.

A DNS is also limited in the handling of errors or variations in the inputted Domain Name such as those caused by misspelling or mistakes, such as insertion of an underline instead of a hyphen in the address. These errors or variations often cause the DNS to not recognize and/or improperly resolve the address string, resulting in the failure of the user to connect to an intended destination in a DNS based system. In addition, a DNS based system is largely limited to the Internet web addresses and does not address the problem of multiple address strings for other communication applications such as emails and telephone numbers.

Recent attempts in dealing with the problems of several address strings have revolved around consolidating the address strings by use of Unified Messaging Systems such as Microsoft's Exchange Server and MCI's Onebox.com message delivery system. These attempts, however, fall short of solving the problem of multiple addressing strings per user for several reasons. First, the messaging system approach revolves around the sending of a message via fax, voice box, etc. This however, does not allow for a direct calling and connecting to a human being by a standard voice call as in a telephone system. Second, the messaging systems are primarily designed for a telephone service operation such as fax, voice box, etc and still do not address the multiple addressing strings problem of other applications such as emails and URL.

It is therefore the objects of the present invention to address the forgoing deficiencies in the prior art.

OBJECTS AND SUMMARY OF THE INVENTION

One object of the present invention to provide systems to receive a valid address string that can be inputted into a communication application selected from a collection of different types of communication applications wherein the same address string can be validly inputted for any selected communication application from that collection.

It is another object of the present invention to provide methods for receiving an address string in the format of a telephone number inputted into at least one communication application selected from a collection of different types of communication applications wherein the same address string can be validly inputted for any selected communication application from that collection.

It is a further object of the present invention to provide methods for receiving an address string inputted into two or more communication applications selected from a collection of different types of communication applications wherein the same address string can be validly inputted for any of the communication applications from that collection.

It is yet another object of the present invention to provide systems and methods for generating a valid Internet address for an Internet communication application by receiving as input at least one inputted string, differentiating between valid components and invalid components in the inputted string and forming at least one valid Internet address for the Internet communication application from the valid components.

Another object of the present invention is to provide methods for converting an address string into a predetermined Internet or email address format by receiving as input at least one inputted address string of alpha-numeric characters and re-sequencing the inputted string into an output string of a different sequence format from the inputted address string wherein the outputted string is in a predetermined Internet or email address format based on the communication application used.

A further object of the present invention is to provide methods for operating domain name servers by substantially dedicating at least one domain name server to service one or more sub-level domain names wherein each of the sub-level domain names is represented by at least one numeric or alphanumeric string in the format of a telephone number.

Another object of the present invention is to provide systems and methods for mapping an address string to a predetermined corresponding number, recognizing numeric categorical identifiers in the mapped output, and re-sequencing the mapped output based on the recognized numeric categorical identifiers to a predetermined hierarchical format.

Accordingly, these and other objects are achieved in the present invention providing addressing strings formats and associated system implementations to minimize the number of different addressing strings used for communicating across different communication applications.

In a first embodiment, the present invention is a system for communicating across at least one communication medium. The system includes an input subsystem to receive an address string, the address string having a valid format recognized by the input subsystem and inputted into at least one communication application selected from a collection of different communication applications wherein the same address string can be inputted for any selected communication application from the collection.

In another aspect of the first embodiment, the present invention is a method for communicating across at least one communication medium. The method includes receiving an address string having the format of a telephone number and inputted into at least one communication application selected from a collection of different communication applications wherein the same address string can be inputted for any selected communication application from the collection.

In yet another aspect of the first embodiment, the present invention is a method for communicating across at least one communication medium. The method includes receiving an address string inputted into two or more communication applications selected from a collection of different communication applications wherein the same address string is inputted for any selected communication application from the collection In a second embodiment, the present invention is a method and system for generating a valid Internet address for an Internet communication application. The method and system includes receiving as input at least one inputted string, differentiating between valid components and invalid components in the inputted string, and forming at least one valid Internet address for the Internet communication application from the valid components.

In a third embodiment, the present invention is a method for converting an address string into a predetermined Internet or email address format. The method includes receiving as input at least one inputted address string, the address string including a plurality of alpha-numeric characters, re-sequencing the inputted string into an output string of a different sequence format from the inputted address string wherein said output string is in a predetermined Internet or email address format based on the communication application used.

In a fourth embodiment, the present invention is a method for operating domain name servers. The method includes substantially dedicating at least one domain name server to serve one or more sub-level domain names wherein each of the sub-level domain names is represented by at least one string of numbers in the format of a telephone number.

In a fifth embodiment, the present invention is a method and system for mapping an address string. The method and system includes receiving as input a valid address string having at least one component wherein said component is a member of an alpha-numeric set, mapping each of the components of said address string to a predetermined corresponding number, recognizing numeric categorical identifiers in the mapped components, and re-sequencing the mapped components based on the recognized numeric categorical identifiers according to a predetermined hierarchical format.

In one exemplary embodiment, the present invention includes but is not limited to an implementation in form of an invention-specific computer executable software code present at the end-user and/or at server(s) within a substantially dedicated top level domain name or email server. The software operates to achieve some or all of the above described embodiments of the present invention.

This brief summary has been provided so that the nature of the invention may be understood quickly. A more complete understanding of the invention can be obtained by reference to the following detailed description of a preferred embodiment thereof and to the drawings.

BRIEF DESCRIPTION OF THE DRAWINGS

Without limiting the invention in anyway, a number of exemplary embodiments of the invention are described below in association with the accompanying drawings. The Figures provided herein are referenced to within the specification in order to better illustrate the workings of exemplary embodiments of the claimed invention. They are in no respect meant to be an exhaustive list of the various embodiments of the present invention.

FIG. 1.0 illustrates a general method by which a user inputs a requests into an input device in form of an input string.

FIG. 1.1 shows a prior art example of multiple diverse requests by users that are inputted into multiple different input devices using multiple different system input strings.

FIG. 1.2 illustrates a sample business card displaying three distinct prior art ways for contacting the business card holder.

FIG. 1.3 illustrates an example of a business card displaying a way for contacting the business card holder according to the claimed invention.

FIG. 1.4 shows an example of multiple diverse requests by users that are inputted into multiple different input devices using the claimed invention's single system input string.

FIG. 3.0 illustrates aspects of the claimed invention as implemented on prior art systems having telephone and the World Wide Web.

FIG. 2.0 is a flow diagram illustrating in greater detail the workings of the claimed invention in a World Wide Web environment.

FIG. 3.2 illustrates aspects of the claimed invention as implemented on prior art systems having electronic mail.

FIG. 2.1 is a flow diagram illustrating in greater detail the workings of the claimed invention in an electronic mail environment.

DETAILED DESCRIPTION OF THE EMBODIMENTS

The systems and methods of the present invention are generally implemented to minimize the number of different addressing strings that are inputted by the users for communicating across different communication applications.

Referring more particularly to the drawings, FIG. 1.0 illustrates a method by which a user's input is translated into machine usable form. As shown in FIG. 1 a user action 100 such as a request to access a World Wide Web (WWW) location is inputted into an input device 101 such as a Web Browser in form of an input string 102.

FIG. 1.1 provides further examples of the general approach illustrated in FIG. 1.0. More particularly, FIG. 1.1 illustrates four diverse user actions 110–113 that are inputted into four different input devices using four different system input strings. In the 110 example, the user action is a request for a telephone connection using a telephone number as an input string. In the 111 example, the user action is a request for accessing a WWW location using a prior art WWW address string as an input string. In the 112 example, the user action is a request for an email correspondence using a prior art email address string as an input string. In the 113 example, similar user actions are requests across other communication applications such as facsimile, File Transfer Protocol, etc using appropriate prior art access methods as an input string for each communication application.

FIG. 1.2 illustrates in the context of a business card 120, one problem associated with the prior art approach of having to use multiple different system input strings. As shown in FIG. 1.2, John Doe represent a typical business card holder who can be reached by three different communication application of telephone 121, the World Wide Web 122 and email 123. The requirement to input multiple different system input strings for each communication application mandates that the business card displays each of the three distinct ways for contacting the business card holder. A disadvantage associated with such approach is that a user who wishes to contact John Doe must input a different address string for each communication application used. In addition, should the business card become unavailable to the user, the user must typically resort to memory in recalling the address strings for contacting the business card holder and having to use three distinct address strings (one for each type of communication application) diminishes the user's chances of recalling each correctly. This problem becomes particularly exacerbated in the circumstances when only one form of the listed communication applications is available to the user. For example, a user might be able to recall Doe's phone number but not the email address which the user may need at the time to forward an important correspondence.

FIG. 1.3 illustrates an example of the business card shown in FIG. 1.2 but utilizing the novel features of the claimed invention in minimizing the number of required input strings. As illustrated in the example, the use of only one input string 125 is sufficient for the business card holder to be contacted using any of the three listed communication applications of telephone, the World Wide Web or email.

FIG. 1.4 further demonstrates the features of the claimed invention as illustrated in the business card example of FIG. 1.3. More particularly, FIG. 1.4 illustrates four diverse user actions 126–129 for contacting John Doe that are inputted into four different input devices but using only one system input strings. In the 126 example, the user action is a request for a telephone connection with John Doe using Doe's provided telephone number (here 18005551234IPN) as an input string. The "IPN" suffix can be inputted as three extra digits of 4,7, and 6 which respectively correspond to the letters "I", "P" and "N" on a standard telephone keypad. In the 127 example, the user action is a request for accessing Doe's WWW location using the claimed invention's address string as an input string. In the 128 example, the user action is a request for an email correspondence with John Dow using Doe's provided email address string as an input string. In the 129 example, similar user actions are requests across other communication applications anticipated to be within the scope of the claimed invention such as facsimile, File Transfer Protocol, etc using appropriate access methods as an input string for each communication application.

The workings of one embodiment of the invention is now disclosed in greater detail starting with FIG. 3.0. FIG. 3.0 illustrates embodiments of the present invention which for simplicity of the illustration are used in a telephone system or the World Wide Web environment.

As shown in FIG. 3.0, a user selects whether to contact John Doe via the telephone or the World Wide Web. In selecting the telephone system 320, the user inputs the input string in the form of a telephone number into the telephone instrument 321. To better demonstrate the workings of the invention the sample input string 18005551234IPN from John Doe's business card is used throughout the detailed description portion of the present invention pertaining to FIG. 3.0. The user inputs the initial digits by simply selecting the correct number on the telephone dial pad. The "IPN" suffix is inputted as three extra digits of 4,7, and 6 which respectively correspond to the letters "I", "P" and "N" on a standard telephone keypad. The additional "476" digits do not affect the initial string since they are subsequently discarded as superfluous digits according to the telephone system protocols implemented on telephone instrument 321, telephone network 323, or another instrument tasked for such purpose. Standard telephone connection protocols are then followed to connect the user the target telephone instrument 325, here John Doe's telephone.

In selecting the computer system 302, the user inputs the input string which is in the form of a telephone number into the appropriate input location of the client's software supporting the desired communication application, such as the Uniform Resource Locator input box of a WWW communication application.

Currently, although some prior art communication applications for the Internet may recognize an input string which is in the form of a telephone number, they are limited to a specific registered form of the input string, with each variation in the name requiring a new registration. For example, a website for selling flowers registered 1-800-flowers would be recognized as different than 1800flowers which the user may have erroneously entered while trying to access the website and may result in the failure of the user to connect to an intended destination. The present invention addresses this problem by implementation of an IPNS Logic 322 to convert an input string which is in the form of a telephone number into a validly recognized Internet addressing input format while allowing for variations and errors in the inputted string. The details of the IPNS Logic software 322 are further discussed in conjunction with FIG. 2.0 below.

As illustrated in FIG. 3.0, the IPNS Logic 322 can reside at either the user's end in form of a client software 316 supporting IPNS Logic 322, or it can be implemented at server's end such as a system database server level 311, or both, as illustrated by the 317 flow. A system database server is typically a Domain Name Server (DNS) or a similar system. The operations of Domain DNS or a similar systems are well known to persons skilled in the art.

In one aspect of this embodiment, the user's address string is inputted into a client software 316 that supports the IPNS Logic 322. The inputted address string is then converted by client IPNS Logic 322 at the client's end to a validly recognized Internet addressing input format. The converted input is then sent through the Internet to an appropriate system database server 319 or 311 as shown by paths 318 or 317. The server 319 or 311 would in turn map the input string to an Internet Protocol (IP) address of the target computer or network device 307 following existing protocols and return the IP address to the client software 316. The client software 316 would then utilize the IP address to lead the user to the intended target computer or network device 307 supporting the desired WWW location, here John Doe's website.

In another aspect of this embodiment, the user's address string is inputted into a prior art software 308 that does not supports the IPNS Logic 322. The existing client software 308 would then follow the existing Internet address resolution protocols and forward the address string to an appropriate system database server 311 which supports IPNS Logic 322. The inputted address string is then converted by IPNS Logic 322 at the server to a validly recognized Internet addressing input format, then mapped to an Internet Protocol (IP) address of the target computer or network device 307 following existing protocols. The IP address is then returned to the client software 316. The client software 316 would then utilize the IP address to lead the user to the intended target computer or network device 307 supporting the desired WWW location, here John Doe's website.

Referring more particularly to FIG. 2.0, the workings of the IPNS Logic 322 is now disclosed in greater detail. In a flow diagram, FIG. 2.0 demonstrates the process sequence within the IPNS logic unit 322.

At stage 200, the user-entered address string is inputted into the IPNS Logic Unit 322. To better demonstrate the workings of the invention the sample input string 1800JKL1234.IPN is used throughout the detailed description portion of the present invention pertaining to FIG. 2.

At stage 203, the portion of the address sting that describes the domain name for which the name server is authoritative is removed. In this way, the IPNS sequence portion within the inputted address string is identified and segregated from the rest of the inputted address string. For example, in the case of the 1800JKL 1234.IPN input string, the "IPN" is removed, leaving the identified and segregated IPNS sequence 1800JKL1234 as the outcome.

At stage 204, the values of each of the characters within the IPNS sequence is translated to a system(s) or system administrator(s) defined values. In an exemplary embodiment, the values are translated according to the following table which is based substantially on a telephone dial pad configuration:

| | | |
|---|---|---|
| 0 | is translated to a | 0 |
| 1 | is translated to a | 1 |
| 2abcABC | is translated to a | 2 |
| 3defDEF | is translated to a | 3 |
| 4ghiGHI | is translated to a | 4 |
| 5jklJKL | is translated to a | 5 |
| 6mnoMNO | is translated to a | 6 |
| 7pqrsPQRS | is translated to a | 7 |
| 8tuvTUV | is translated to a | 8 |
| 9wxyzWXYZ | is translated to a | 9 |

All other characters not included in the translation table such as hyphens and underlines are simply ignored. For example, the IPNS sequence 1800JKL1234 will be translated to 18005551234.

One advantage of the foregoing feature of the present invention is that the variations and mistakes such as insertion of an underline instead of a hyphen are filtered out in the translation process. For example, had the user inputted 1-800-JKL__1234, it would have been still translated to the correct 18005551234 sequence. Thus in a prior art DNS based system that is often sensitive to errors, such variations and mistakes will not cause the DNS to not recognize and/or improperly resolve the address string and result in the failure of the user to connect to an intended destination.

At stage 205, the order in which the characters, fields or a combinations of both are represented (generally from left to right) in the translated IPNS sequence is re-sequenced into a new configuration of from right to left. For example, the translated IPNS sequence 18005551234 will be re-sequenced to 43215550081.

At stage 206, the re-sequenced IPNS sequence is segmented according to a changeable data-driven segmentation format. The segmentation format is used to determine the number of fields within the sequence, and the length in number of characters, of each field for the purpose of inserting dots (i.e ".") in between the fields within the sequence. An example of a segmentation format is the 4-3-4 format wherein the IPNS sequence number is segmented from right to left, first into a group of four rightmost digits, then the next three followed by the last four. A dot is then inserted between each segmented group. For example, the re-sequenced to 43215550081 IPNS sequence will be segmented under the 4-3-4 format to 4321.555.0081. The segmentation is also data driven and recognizes numeric categorical identifiers such as country code or local area codes so that in the case of an inputted IPNS sequences having a different format, such as ones following the telephone number format of a foreign country, a different segmentation format can be used. In an exemplary embodiment, the different segmentation formats are changeable so that adjustments to the formatting setup can be made when desired or needed. In addition, the different segmentation formats are stored in a database for retrieval by the IPNS processor.

At stage 207, the removed portion of the address string at stage 203 that described the domain name for which the name server is authoritative is now re-attached to the re-sequenced segmented IPNS sequence. The result is to reconstruct the input string into a format that is compatible with the underlying communication technology and addressing system. For example, the 4321.555.0081 is reconstructed to 4321.555.0081.ipn.

Following stage 207, the name server is allowed to process the outgoing string 209 as if it were an original DNS query, according to the DNS protocols. If no alias information is found for the string, then the name server should send to the DNS resolver data which presents the new string as the canonical name for the original domain queried, in addition to any resolution data belonging to the new DNS address.

It is noted that the different stages and specific order of the foregoing operations are meant to be exemplary only and any process using one or more of the disclosed routines which yields a string that is consistent with the desired format of the outgoing string 209 is anticipated to be within the scope of the claimed invention.

FIG. 3.2 illustrates another embodiment of the present invention used in an electronic mail (email) environment. As illustrated, client softwares 366 and 358 are connected to client email server 350 which interfaces with the Internet address-resolution system such as the system database servers 319 or 311 using IPNS Logic 322 in order to acquire the Internet Protocol (IP) address of target email server 355. The target email server 355 receives and processes the email message's address using IPNS Email Logic 356 in order to resolve the address to a canonical email address, and then forwards the email message to the recipient via path 371.

The embodiment illustrated in FIG. 3.2 will now be discussed in greater detail. To better demonstrate the workings of the invention the sample input string 1800JKL1234.IPN is used throughout the detailed description portion of the present invention pertaining to FIG. 3.2 and later to FIG. 2.1.

Starting at stage 348, the user, based on the availability or selection of the new or existing software, inputs the input string which is in the form of a telephone number into the appropriate location of either the new client software 366 or the existing client software 358, both of which support email communication applications and are connected a client email server 350. For example, the user enters the address string "1-800-555-1234.ipn" or "18005551234.ipn" into ("Send to:") box of an email program running on a computer that is connected to the Internet. Currently, prior art email protocols generally do not recognize an input string which is in the form of a telephone number as a valid input due to the absence of the "@" symbol in the string. The present invention addresses this problem by implementation of one or more of IPNS Converter Logic 351, IPNS Logic 322 and IPNS Email Logic 356. The IPNS Logic 322 used for the electronic mail communication application is the same as the IPNS Logic disclosed in FIG. 2.0 in conjunction with the World Wide Web embodiment illustrated in FIG. 3.0. The details of the IPNS Email Logic software 356 are further discussed in conjunction with FIG. 2.1 below.

In an exemplary embodiment illustrated in FIG. 3.2 and following path 365, the IPNS Logic 322 resides in the client software 366 and converts an input string which is in the form of a telephone number directly into a validly recognized Internet addressing input format. Because of the requirements of the existing email protocols, the converted inputted address must generally include an "@" symbol and at least one character or the client software will generally not accept the input in order to initiate the address resolution process. The IPNS Convertor Logic 351 then converts the output of the IPNS Logic 322 into a validly recognized Internet email addressing input format by attaching an "@" symbol and at least one character in order for the client software to initiate the address resolution process. Unlike the prior art systems however, in the address string of the present invention the "@" symbol and the accompanying character are included merely to give the telephone address string the appearance of a valid address in compliance with the existing email protocols so that the address resolution process may be initiated. One advantage of the foregoing feature is that the user is no longer in need of entering an email address having an "@" symbol.

The new client software 366 would then send the converted input to client email server 350. Since some client software applications accept a user input address string without an "@" symbol and forward them to their client email server 350 for address resolution, the client email server 350 may also contain an IPNS Convertor Logic 351 to convert the output of the IPNS Logic 322 into a validly recognized Internet email addressing input format by attaching an "@" symbol and at least one character. The client email server 350 would then send the input through the Internet to an appropriate system database server 319 or 311 as shown by paths 368 or 369. A System Database Server is typically a Domain Name Server (DNS) or a similar system, the operations of which are well known to a person skilled in the art. The DNS server 319 or 311 would in turn map the input string to an Internet Protocol (IP) address of the email server that supports email service for recipient (here John Doe) following existing protocols and return the IP address to the client software 366. The client email server 350 would then utilize the IP address to forward the email packets along with the user's address string to the IP address destination, generally belonging to a target email server 355 that supports email service for the recipient.

In another aspect of the FIG. 3.2 embodiment, the user's address string is inputted into a prior art existing client software 358 that does not supports the IPNS Logic 322. Because of the requirements of the existing email protocols, the user inputted address must include an "@" symbol and at least one character or the client software will generally not accept the input in order to initiate the address resolution process. Unlike the prior art systems however, in the address string of the present invention the "@" symbol and the accompanying character are included merely to give the telephone address string the appearance of a valid address in compliance with the existing email protocols so that the address resolution process may be initiated. The user thus does not need to know of any specific pre-set character sequence to enter preceding the "@" symbol, as generally any arbitrary character input would now be sufficient. For example, the sample input string 18005551234.IPN from John Doe's business card will be entered in the format of:

<arbitrary character(s)>@118005551234.IPN.

The existing client software 358 would then follow the existing Internet address resolution protocols and forward the address string to the client email server 350 which would in turn forward it to an appropriate system database server 319 which supports IPNS Logic 322. At some stage before entering the IPNS Logic 322 the "@" symbol and all preceding characters are generally separated from the domain name portion (here the IPNS sequence) following existing email protocols. For example in the case of <arbitrary character(s)>@18005551234.IPN, only the IPNS sequence 18005551234.IPN would remain. The IPNS sequence is then converted by IPNS Logic 322 at the server to a validly recognized Internet addressing input format, then mapped to an Internet Protocol (IP) address of the email server that supports email service for recipient (here John Doe) following existing protocols. The IP address is returned to the client email server 350 which would then utilize the IP address to forward the email packets along with the user's address string to the IP address destination, generally belonging to a target email server 355 that supports email service for the recipient.

At the target email server 355, the IPNS Email Logic 356 maps the user's address string to a canonical email address of the intended recipient. The target email server 355 then forwards the email message to the intended recipient.

FIG. 2.1 further illustrates the process flow within the IPNS Email Logic 356. At stage 213, the incoming data 210 is recognized as an email message containing a valid address format, and is uploaded into the IPNS Email Logic 356. A valid address format can be in either the format of a telephone number such as for example 18005551234.IPN or one using conventional "@" symbol such as <arbitrary character(s)>@18005551234.IPN. In this way, the IPNS Email Logic 356 can map addresses coming from either the New Client Software 366 or the prior art client software 358.

At stage 214, the mapping of the user's address string to a canonical email address 214 is performed by the email server in order to determine the email address to which to forward the message. For example the user inputted address string of 18005551234.ipn or <arbitrary character(s)>@18005551234.IPN is mapped to J-Doe@someisp.com where J-Doe@someisp.com is a functioning email account where John Doe receives his incoming email.

At stage 215, the email message is forwarded to the canonical email address found.

In an exemplary embodiment, the target email server 355 includes a database which contains a list of incoming email addresses and their corresponding canonical email addresses. The database is then queried by the IPNS Email Logic 356 at stage 214 for mapping of the incoming email addresses to their corresponding canonical email. If a canonical email address is found, the flow proceeds to stage 215 at where the process of forwarding the email to the canonical email address is initiated by the email server in accordance with DNS, SMTP, POP, and/or the relevant standards or protocols, if any. If a canonical email address is not found, the target email server 355 alerts other relevant email servers on the network of an improper address in accordance with DNS, SMTP, POP, and/or the relevant standards or protocols, if any.

Thus as disclosed above, one IPNS Address, such as for example 1-800-555-1234.ipn, can be used to make a phone call, access a web page, and send an email.

In one exemplary embodiment of the present invention, at least one domain within the domain name system is substantially (preferably 100%) dedicated to the servicing of the IPNS addresses. The dedicated domain name system is also organized to ensure that IPNS addresses are usable, in part, for actual standard communication with an intended party directly via telephone; for web-page access in relation to the intended recipient; and for the sending of an e-mail message to the intended recipient. The organizing feature also includes electronic or conventional publications of user and administrative manuals of all the possible permutations of allowable addressing strings and use-parameters within the system. The user and administrative manual would disclose the makeup of the allowed addressing strings in the format of a telephone number within the dedicated domain.

The dedicated domain is also sufficiently sophisticated to recognize and process IPSN addresses which may contain additional human-readable modifiers such as indicators of a telephone number extension or a company trademark element in a defined position within the addressing string. For example by entering the extension "321" in the format of 1-234-567-8900x321.ipn would direct a communication or a request for a web page to the phone number or web page of the person or department designated to be at extension 321 at that number within the organization or business that has subscribed to the system of the present invention. Another example would be: 1-234-567-8900*Roger.IPN. This address string would direct a communication or request for a web page or email to the phone, email or web page of the specific person or department designated to be at the extension allocated as "Roger" at that number as administered within the system.

The addressing string could also be expanded by the addition of any valid Trademark held by the holder of the telephone number that is mirrored by the telephone-number-look-alike-string. For example, valid addresses that the system could recognize could be: 1-800-555-1234.McDonalds.ipn or McDonalds.1-800-555-1234.ipn.

The addressing string can also be expanded by the inclusion of dot-delimited sub-domains prior to or after the telephone-number-look-alike-string of one of the following types:

iii) (.)fax(.)
iv) (.)pager(.)
v) (.)cell(.)
vi) (.)message(.)
vii) (.)instant-message(.)
viii) (.)chat(.)
ix) (.)ftp(.)

x) (.)gopher(.)
xi) (.)e-mail(.)[redundant, but could be used]
xii) (.)web-page(.) (redundant, but could be used)
xiii) etc.

Other dot-delimited sub-domains also might be added over time. For example, a valid addresses that the system could recognize could be: 1-234-567-8900.fax.ipn OR fax.1-234-5676-8900.ipn. In this case, the domain's processing would indicate that the incoming data was a fax. The domain-processing itself would act as a "router" in this case to the correct final destination of any communication or request for information.

The dedicated domain system, in addition, processes the IPNS addresses according to error-correcting coded and programmed algorithms that facilitate the usability of the system. The processing in part includes the loading of custom address-processing utilities in a dedicated domain name server within that domain; the loading of a custom e-mail utility in a dedicated email server; and ensuring that the dedicated e-mail server is accessible to the dedicated domain name system.

The dedicated domain is also provided with proper administration and technical services to assure that it is properly functioning. Proper administration of the dedicated domain includes, but is not limited to, the setting up of administration software to allow the representative of the dedicated domain to collect, input and store information from a new address subscriber. A database that contains the subscriber's canonical email address is used to map one or more iteration of a telephone-number-look-alike-string address to a canonical email address and/or to the website address chosen by a subscriber. In this way, the representative of the dedicated domain or the subscriber would be able to quickly change relevant elements of the database. For example, email sent to a particular telephone-number-look-alike-string address can be re-routed to a different canonical email address for a period of time or as a basic change to the subscriber's profile.

Finally, the representatives of the domain or the subscribers would be able, through the use of the software, to add or delete modifiers to the basic IPNS address, if any exist, such as having each instance of an IPNS address with a different modifier to map to a different canonical email address.

It is noted that the foregoing different embodiments of the present invention were illustrated separately at times for the purpose of simplicity of diagrams and related description of the specification. Any process or system using one or more of the disclosed embodiments is anticipated to be within the scope of the claimed invention.

Other embodiments and advantages of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for communicating across at least one communication medium, said system comprising:
    a plurality of input subsystems to receive an address string, said address string having a valid format recognized by said input subsystems and inputted into at least one communication application selected from a collection of different types of communication applications wherein the same address string can be validly inputted for any selected communication application from said collection;
    a translation subsystem to translate each component of said address string to a corresponding predetermined number;
    a segmentation subsystem to segment said translated components into at least one subset according to a predetermined segmentation format;
    a re-sequencing subsystem to re-sequence said segmented components into an output string of a different sequence format from said inputted address string wherein said output string is in a predetermined re-sequencing format; and
    a resolver subsystem to resolve said re-sequenced string into a corresponding valid address format.

2. The system of claim 1 wherein said address string is associated with at least one recipient entity.

3. The system of claim 2, where said address string is a registered domain name.

4. The system of claim 1, said input subsystem further comprising:
    a recognition subsystem to recognize said inputted address string having a different format from a format utilized by said selected communication application; and
    a mapping subsystem to convert said different format into at least one format utilized by said selected communication application.

5. The system of claim 1, said system further comprising:
    a selector subsystem to determine at least one communication medium based on the selected communication application; and
    a communication subsystem to establish communication based on the address string across said determined communication medium.

6. The system of claim 5, wherein said at least one communication medium is selected from the group of homogenous and of heterogeneous mediums.

7. The system of claim 1 wherein said collection of different communication applications include communication applications having different formats.

8. The system of claim 1, wherein said corresponding valid address format is used to establish communication with a World Wide Web location.

9. The system of claim 1, wherein said collection of different communication applications include communication applications having diverse formats.

10. The system of claim 9, wherein said communication application is a world wide web resource locator.

11. The system of claim 9, wherein said communication application is a telephone service.

12. The system of claim 9, wherein said communication application is an electronic mail application.

13. The system of claim 1, said mapping subsystem further comprising:
    a transmission subsystem to transmit said inputted string to a matching subsystem based on said corresponding valid address format, said matching subsystem to match said inputted string to at least one valid email address wherein said valid email address is used to relay communication to said valid email address destination.

14. The system of claim 1, said mapping subsystem further comprising:
    a convertor subsystem to convert said valid address format into a valid email address format, said valid email address format comprising of said valid address format preceded by an "@" symbol and at least one character.

15. The system of claim 1, wherein said corresponding valid address format includes a top level domain name, where the top level domain is dedicated to the purpose of registering domain names comprising telephone numbers.

16. The system of claim 1, wherein said corresponding valid address format includes a top level domain name, where the top level domain is restricted to the purpose of registering domain names comprising telephone numbers.

17. The system of claim 1, wherein said corresponding valid address format includes a top level domain name, where the top level domain is sponsored for the purpose of registering domain names comprising telephone Nos.

18. A method for a user communicating across at least two communication media, said method comprising:
receiving an address string comprising at least a telephone number of a target entity and terminating in a top level internet domain,
recognizing said inputted address string having a different format from a format utilized by said selected communication application; and
mapping said different format into at least one valid address format utilized by said selected communication application; and
translating each component of said address string to a corresponding predetermined number;
segmenting said translated components into at least one subset according to a predetermined segmenting format;
re-sequencing said segmented components into an output string of a different sequence format from said inputted address string wherein said output string is in a predetermined re-sequencing format;
and inputting said address string into any communication application selected from a plurality of diverse communication applications chosen from the group of a telephone, a web browser, and a voice over internet protocol telephone wherein the same address string can be validly inputted by the user for any selected communication application of the user to reach a respective communication application of a second user.

19. The method of claim 18, said method further comprising:
determining at least one communication medium based on the selected communication application; and
establishing communication across said determined communication medium.

20. The method of claim 19, wherein said at least one communication medium is a homogenous medium or a plurality of heterogeneous mediums.

21. The method of claim 18, wherein said communication application is a world wide web resource locator.

22. The method of claim 18, wherein said communication application is a telephone service.

23. The method of claim 18, wherein said communication application is an electronic mail application.

24. The method of claim 18, wherein said corresponding valid address format is an Internet website address format.

25. The method of claim 18, wherein said address string consists of a registered domain name.

26. The method of claim 25, wherein said registered domain is a subdomain of a top level domain dedicated to registering subdomains that include telephone numbers in the address string.

27. The method of claim 25, wherein said registered domain is a subdomain of an upper level domain dedicated to registering address strings each comprising at least a telephone No.

28. The method of claim 25, wherein said registered domain is a subdomain of a top level domain dedicated to registering domain names that comprise numeric telephone numbers.

29. The method of claim 25, wherein said registered domain is a subdomain of a top level domain dedicated to registering domain names in the form of "tel"."domain" where "tel" is a telephone number consisting only of numeric digits from 0 to 9 and "domain" is the domain name.

30. The method of claim 25, wherein said registered domain is a subdomain of a top level domain dedicated to registering domain names in the form of "tel"."tld" where "tel" is a telephone number consisting only of numeric digits from 0 to 9 and "domain" is the top level domain name.

31. The method of claim 25, wherein said registered domain is a subdomain of a top level domain formed to register domain names in the form of "tel"."tld" where "tel" is a telephone number consisting only of numeric digits from 0 to 9 and "domain" is the top level domain name.

32. The method of claim 25, wherein said registered domain name includes a top level domain dedicated solely to registering domain names in the form of "tel"."tld" where "tel" is a telephone number consisting only of numeric digits from 0 to 9 and "domain" is the top level domain name.

33. The method of claim 18, said mapping further comprising:
transmitting said inputted string based on said corresponding valid address format; and
receiving said transmitted input string and matching said inputted string to at least one valid email address wherein said valid email address is used to relay communication to said valid email address destination.

34. The method of claim 18, said mapping further comprising:
converting said valid address format into a valid email address format wherein said valid email address format comprising of said valid address format preceded by an "@" symbol and at least one character.

35. The method of claim 18, further comprising the step of resolving said re-sequenced string into a corresponding valid address format.

36. The method of claim 18, wherein said plurality of diverse communication applications include communication applications having the same or diverse formats.

37. The method of claim 18, wherein the top level internet domain is dedicated to the purpose of registering domain names comprising telephone numbers.

38. The method of claim 18, wherein the top level internet domain is substantially restricted to the purpose of registering domain names comprising telephone numbers.

39. The method of claim 18, wherein the top level internet domain is TLD is sponsored for the purpose of registering domain names comprising telephone numbers.

40. A method for communicating across at least one communication medium, said method comprising:
receiving an address string inputted into a plurality of communication applications selected from a collection of different types of communication applications, including an analogue telephone;
recognizing said inputted address string having a different format from a format utilized by said selected communication application; and
mapping said different format into at least one valid address format utilized by said selected communication application translating each component of said address string to a corresponding predetermined number;

segmenting said translated components into at least one subset according to a predetermined segmenting format;

re-sequencing said segmented components into an output string of a different sequence format from said inputted address string wherein said output string is in a predetermined re-sequencing format; and resolving said re-sequenced string into a corresponding valid address format;

wherein the same address string can be validly inputted for any selected communication application from said collection and can be interpreted by a telephone system and a domain name server.

41. The method of claim 40, said method further comprising:

determining at least one communication medium based on the selected communication applications; and establishing communication across said determined communication medium.

42. The method of claim 40, wherein said corresponding valid address format is an Internet website address format.

43. The method of claim 40, wherein said corresponding valid address format is an Internet electronic mail address format.

44. The method of claim 40, wherein said address string is associated with at least one recipient entity.

45. The method of claim 40, said mapping further comprising:

transmitting said inputted string based on said corresponding valid address format; and receiving said transmitted input string and matching said inputted string to at least one valid email address wherein said valid email address is used to relay communication to said valid email address destination.

46. The method of claim 40, said mapping further comprising:

converting said valid address format into a valid email address format wherein said valid email address format comprising of said valid address format preceded by an "@" symbol and at least one character.

47. The method of claim 40, wherein said address string is a validly registered domain name.

48. The method of claim 40, wherein said address string includes a top level domain name, and where the top level domain is dedicated to the purpose of registering domain names comprising telephone numbers.

49. The method of claim 40, wherein said address string includes a top level domain name, and where the top level domain is restricted to the purpose of registering domain names comprising telephone numbers.

50. The method of claim 40, wherein said address string includes a top level domain name, and where the top level domain is sponsored for the purpose of registering domain names comprising telephone numbers.

51. A method of connecting a user's communication applications across at least two diverse communication media to a recipient's respective communication applications using a common address string, the method comprising the steps of:

forming said common address string by combining the recipient's telephone number with a top level domain name in the form of "telno" "x" "tld", where "telno" is the recipient's telephone number consisting only of numeric digits from 0 to 9, "x" is a miscellaneous ASCII string, and "tld" is the top level domain name;

inputting at least a portion of said common address string into at least two of the user's communication applications;

the user's said at least two communication applications using said inputted portion of said common address string to connect with said respective communication applications of the recipient;

wherein a first of said at least two said diverse communication media is chosen from the group of telephone systems, e-mail systems, world wide web resource locators and internet browsers; and wherein a second of said at least two said diverse communication media is chosen from the group of e-mail systems, world wide web resource locators and internet browsers; and converting said common address string into a valid email address format wherein said valid email address format comprises said common address string preceded by an "@" symbol and at least one character.

52. The method according to claim 51, wherein said common address string forms a valid internet domain name or sub-level domain name.

53. The method according to claim 51, wherein said common address string also further includes a dot-delimited sub-level domain to further distinguish the final address.

54. The method according to claim 51, wherein said common address string also further includes a dot-delimited subdomain to determine the communication medium.

55. The method of claim 51, wherein said second of said at least two communication applications is a world wide web resource locator.

56. The method of claim 51, said second of said at least two communication applications is a telephone service.

57. The method of claim 51, said second of said at least two communication applications is an electronic mail application.

58. The method according to claim 51, wherein said common address string is a registered, internet domain name.

59. The method of claim 51, wherein the top level domain is dedicated to the purpose of registering domain names comprising telephone numbers.

60. The method of claim 51, wherein the top level domain is restricted to the purpose of registering domain names comprising telephone Nos.

61. The method of claim 51, wherein the top level domain is sponsored for the purpose of registering domain names comprising telephone numbers.

62. A method of connecting a user's communication applications across at least two diverse communication media to a recipient's respective communication applications using a common address string, the method comprising the steps of:

forming said common address string by at least combining the recipient's telephone number with a top level domain name;

inputting at least a portion of said common address string into at least two of the user's communication applications;

the user's said at least two communication applications using said inputted portion of said common address string to connect with said respective communication applications of the recipient, wherein a first of said at least one of said diverse communication media is chosen from the group of telephone systems, e-mail systems, world wide web resource locators and internet browsers;

providing a processor subsystem to differentiate between valid components and invalid components in said inputted portion of said common address string;

selectively stripping predetermined non-alphanumeric, invalid components of the inputted portion of said common address string to form a stripped input string;

selectively mapping predetermined non-numeric, invalid components of said inputted portion of said common address string to a corresponding number grouped in the format as represented by buttons of a telephone key pad to form a registered internet address;

wherein said registered internet address is used by said at least one of said at least two communication applications to connect with at least one of said respective communication applications of the recipient.

63. The method according to claim 62 wherein said registered internet address includes at least the form of "telno.domain" where "telno" is the recipient's telephone number and "domain" is a valid internet domain name.

64. The method of claim 63, wherein said domain is a top level domain name.

65. The method according to claim 62 wherein said subsystem is incorporated into a internet domain name system denominated by said top level domain of said common address string.

66. The method according to claim 62 wherein said subsystem is incorporated into the user's client software.

67. The method according to claim 62 wherein common address string is in the form of "telno.x.domain" where "telno" is the recipient's numeric telephone number, "x" is a miscellaneous ASCII string, and "domain" is a valid, registered internet domain name.

68. The method of claim 67, wherein said "domain" is a top level domain.

69. The method of claim 62, comprising the additional steps of:
converting said common address string into a valid email address format wherein said valid email address format comprises said common address string preceded by an "@" symbol and at least one character.

70. The method of claim 62, wherein the top level domain is dedicated to the purpose of registering domain names comprising telephone numbers.

71. The method of claim 62, wherein the top level domain is restricted to the purpose of registering domain names comprising telephone numbers.

72. The method of claim 62, wherein the top level domain is sponsored for the purpose of registering domain names comprising telephone numbers.

73. A method for a first user communicating to a second user over a plurality of communication media, comprising the steps of:
receiving from the second user a numeric telephone number string associated with the second user, wherein said telephone number string includes at least seven digits and said telephone number string consists only of the numeric digits from 0 to 9;
assigning the second user a user domain name which includes at least said telephone number string and a top level domain; wherein the top level domain includes a plurality of sub-level domain names comprising telephone number strings, wherein said telephone number strings consist only of the numeric digits from 0 to 9;
wherein the first user can connect to the second user by telephone by dialing said telephone number string, and the first user can retrieve a webpage of said second user by entering said user domain name in a webbrowser; and
wherein said user domain name is in the form of "telno.domain", where "telno" is said telephone number string and "domain" is a valid, registered internet domain name.

74. The method of communication of claim 73, wherein at least 80% of all of the second level domains of said top level domain comprise telephone number strings.

75. The method of communication of claim 74, wherein at least 90% all of the sub-level domains of said top level domain comprise telephone strings.

76. The method of communication of claim 73, wherein said user domain name is in the form of "telno.domain", where "telno" is the second user's numeric telephone number string and "domain" is a valid, registered internet domain name.

77. The method of communication of claim 73, wherein said top level domain is dedicated to registering second level domains in the form of "telno.tld" where "telno" is the second user's numeric telephone number string, and "tld" is a valid, registered internet top level domain name.

78. The method of communication of claim 73, wherein said user domain name is in the form of "telno.x.domain", where "telno" is said telephone number string, "x" is an ASCII string, and "domain" is a valid, registered internet domain name.

79. The method of communication of claim 73, comprising the further step of assigning the second user a text messaging address which includes at least said telephone number string, and wherein the second user can receive text messages addressed to said text messaging address.

80. The method of communication of claim 73, comprising the further step of assigning the second user an instant messaging address which includes at least said telephone number string, and wherein the second user can receive instant messages addressed to said instant messaging address.

81. The method of communication of claim 73, comprising the further step of assigning the second user a webphone address which includes at least said telephone number string, and wherein the second user can receive webphone calls addressed to said webphone address.

82. The method of communicating of claim 73, further comprising the step of:
assigning the second user a valid user e-mail address which includes at least said telephone number string, an "@" separator and a top level domain;
wherein the second user can receive an e-mail message from the first user at said user e-mail address.

83. The method of communication of claim 82, wherein said user e-mail address is in the form of "telno@x.tld", where "telno" is the second user's numeric telephone number string, "x" is an ASCII string, and "tld" is a valid, registered top level domain name.

84. The method of communication of claim 82, wherein said user e-mail address is in the form of "x@telno.tld", where "telno" is the second user's numeric telephone number string, "x" is a miscellaneous ASCII string, and "tld" is a valid, registered top level domain name.

85. The method of communication of claim 82, wherein said user e-mail address is in the form of "x@telno.y.tld", where "telno" is the second user's numeric telephone number string, "x" is a miscellaneous ASCII string, and "y" is a miscellaneous ASCII string, and "tld" is a valid, registered top level domain name.

86. The method of communication of claim 82, wherein said user e-mail address is in the form of "x@telno.y.tld", where "telno" is the second user's numeric telephone number string, "x" is a miscellaneous ASCII string, and "y.tld" is a valid, registered second level domain name.

87. The method of communication of claim 82, wherein said user e-mail address is in the form of "x@telno.y.tld", where "telno" is the second user's numeric telephone number string, "x" is a miscellaneous ASCII string, and "y.tld" is a valid, registered non-top level domain name.

88. The method of communication of claim 82, wherein said user e-mail address is in the form of "x@telno.y.tld", where "telno" is the second user's numeric telephone number string, "x" is a miscellaneous ASCII string, and "y.tld" is a valid, registered sub-level domain name.

89. The method of communication of claim 82, wherein said user e-mail address is in the form of "user@telno.y.tld", where "telno" is the second user's numeric telephone number string, "y" is a miscellaneous ASCII string, and "tld" is a valid, registered top level domain name.

90. The method of claim 73, wherein said top level domain includes at least 10 second level domain names comprising telephone strings.

91. The method of claim 73, wherein said top level domain includes at least 25 second level domain names comprising telephone strings.

92. The method of claim 73, wherein said top level domain includes at least 100 second level domain names comprising telephone strings.

93. The method of claim 73, wherein said top level domain includes at least 1000 second level domain names comprising telephone strings.

94. The method of claim 73, wherein said top level domain includes at least 5000 second level domain names comprising telephone strings.

95. The method of claim 73, wherein said top level domain is dedicated to registering second level domain names comprising telephone strings.

96. The method of claim 73, wherein said top level domain includes at least 10 lower level domain names comprising telephone strings.

97. The method of claim 73, wherein said top level domain includes at least 25 lower level domain names comprising telephone strings.

98. The method of claim 73, wherein said top level domain includes at least 100 lower level domain names comprising telephone strings.

99. The method of claim 73, wherein said top level domain includes at least 1000 lower level domain names comprising telephone strings.

100. The method of claim 73, wherein said top level domain is dedicated to the registration of domain names comprising telephone number strings, having at least 1000 lower level domain names comprising telephone strings.

101. The method of claim 73, wherein said top level domain includes at least 5000 lower level domain names comprising telephone strings.

102. The method of claim 73, wherein said top level domain is dedicated to registering lower level domain names comprising telephone strings.

103. The method of claim 73 wherein said numeric telephone number string is a valid, fully qualified telephone number.

104. The method of claim 73 wherein said numeric telephone number string is a valid, fully qualified telephone number according to any internationally recognized standard.

105. The method of claim 73 wherein said numeric telephone number string is a valid, fully qualified telephone number according to the International Telephone Union Standard E.164.

106. The method of claim 73, wherein at least one sub-level domain of the top level domain includes a plurality of lower-level domain names comprising telephone number strings, wherein said telephone number strings consist only of numeric digits between 0 and 9.

107. The method of communication of claim 73, wherein said top level domain is dedicated to registering sub-level domains in the form of "telno.domain" where "telno" is the second user's numeric telephone number, and "domain" is a valid, registered internet domain name.

108. The method of claim 73, wherein the top level domain is dedicated to the purpose of registering domain names comprising telephone numbers.

109. The method of claim 73, wherein the top level domain is substantially restricted to the purpose of registering domain names comprising telephone numbers.

110. The method of claim 73, wherein the top level domain is sponsored for the purpose of registering domain names comprising telephone Nos.

\* \* \* \* \*